Aug. 24, 1943.　　　W. J. DAILY　　　2,327,509
SPRING MOTOR
Filed Nov. 25, 1939　　　2 Sheets-Sheet 1
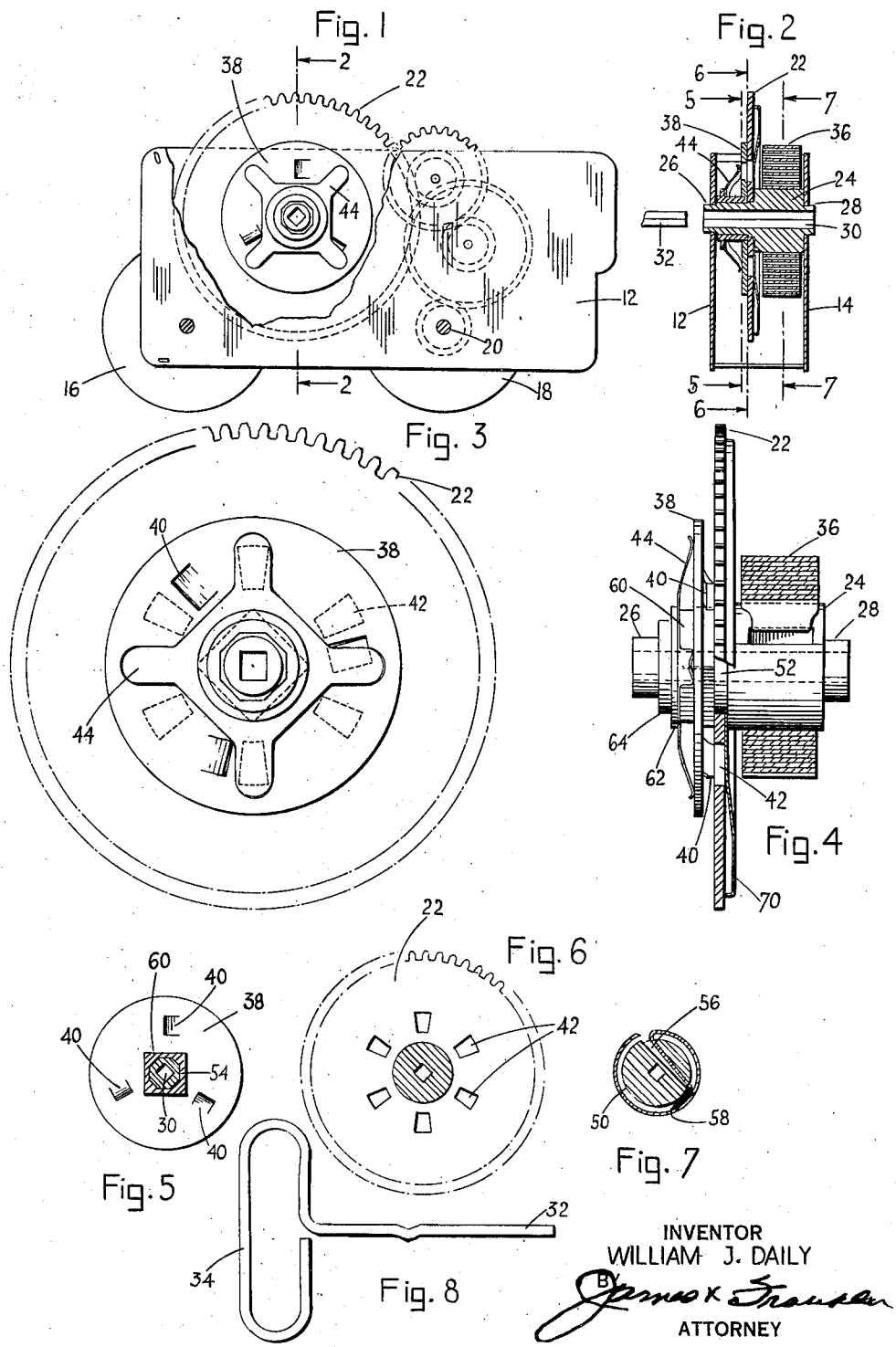
INVENTOR
WILLIAM J. DAILY
ATTORNEY Aug. 24, 1943.                W. J. DAILY                2,327,509
                              SPRING MOTOR
                        Filed Nov. 25, 1939           2 Sheets-Sheet 2

INVENTOR
WILLIAM J. DAILY
BY
ATTORNEY

Patented Aug. 24, 1943

2,327,509

UNITED STATES PATENT OFFICE 2,327,509

SPRING MOTOR

William J. Daily, Girard, Pa., assignor to Louis Marx & Company, Inc., New York, N. Y., a corporation of New York Application November 25, 1939, Serial No. 306,061

11 Claims. (Cl. 185—37)

This invention relates to spring motors, and more particularly the main gear assembly thereof.

The primary object of my invention is to generally improve the main gear assembly of spring motors, such as are commonly used in toys. A more particular object is to provide a comparatively simple and inexpensive ratchet of increased strength, between the winding shaft and the main gear.

Difficulty has heretofore been encountered in the event of a child pushing or pulling a vehicle toy along the floor after the motor has already run down. Such movement of the vehicle tends to excessively unwind the spring, resulting in breakage of the spring, or escape of the inner end of the spring from the winder bushing. It is true that the ratchet teeth are so shaped that it should be possible for the wheels to turn without excessively unwinding the spring, but with spring ratchets, as heretofore constructed, the ratchet action is comparatively stiff in order to provide a ratchet of sufficient strength, and the main spring therefore tends to excessively unwind before the desired reverse ratchet action manifests itself. A further object of my invention is to overcome this difficulty and to provide a ratchet which overruns very readily, so that a vehicle toy can easily "free wheel" or be moved forward without unwinding the spring beyond its normal amount.

Still another object of the invention is to provide a main spring assembly which is readily and quickly assembled. For this purpose, I provide a two-part bushing, the parts of which may be telescoped together in a small press, with the various parts of the main gear and ratchet assembled on the two-part bushing as the two parts are forced together.

To the accomplishment of the foregoing, and such other objects, as will hereinafter appear, my invention consists in the spring motor elements and their relation one to the other, as hereinafter are more particularly described in the specification and sought to be defined in the claims. The specification is accompanied by drawings, in which Fig. 1 is a side elevation of a spring motor for a toy locomotive with a part of one side plate of the motor cut away;

Fig. 2 is a section taken in the plane of the line 2—2 of Fig. 1;

Fig. 3 is a front elevation of the main gear assembly;

Fig. 4 is a partially sectioned side elevation of the same;

Fig. 5 is a section taken in the plane of the line 5—5 of Fig. 2;

Fig. 6 is a section taken in the plane of the line 6—6 of Fig. 2;

Fig. 7 is a section taken in the plane of the line 7—7 of Fig. 2;

Fig. 8 is a side elevation of a square shank key intended for use with the main gear assembly;

Figure 9:
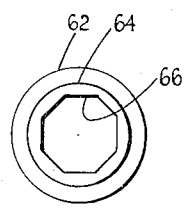
Fig. 9 is an end elevation of the ratchet bushing.

Referring to the drawings, and more particularly to Fig. 1, the invention as shown is applied to a conventional spring motor used for a toy locomotive, but it will be understood that the invention is applicable to spring motors used for other toy purposes. The body of the locomotive is not shown, it being assumed to have been removed from the motor assembly. The latter comprises side plates 12 and 14 carrying a pair of idle wheels 16 and a pair of driven wheels 18. In Fig. 1 the nearer wheels have been omitted. The axle 20 of the driven wheels is driven by the spring through a large main gear 22, and an ensuing train of step-up gearing which may be of conventional character, as is schematically indicated in the drawings.

The winder bushing 24 is journalled in the side plates 12 and 14 on bearings 26 and 28 formed at each end of the bushing. In the present case the bushing is provided with a square hole 30 extending therethrough and adapted to receive the square shank 32 of a key 34, said key being illustrated in Fig. 8. The main gear 22 is freely rotatable on bushing 24. The inner end of the main spring 36 is connected to the bushing and its outer end is connected, at any appropriate point, to the frame of the motor. A ratchet disc 38 is arranged for cooperation with main gear 22, and is non-rotatable relative to the bushing. The spring in unwinding turns the bushing and with it the ratchet disc 38, and this in turn rotates the main gear 22. When winding the motor, however, the winder bushing and ratchet disc are turned in opposite direction, and main gear 22 need not rotate.

Ratchet disc 38 is provided with three broad, inwardly struck ratchet teeth 40, best shown in Figs. 4 and 5. Main gear 22 is provided with six mating slots 42, best shown in Fig. 6. The ratchet disc need not be made of resilient material. It is simply a rigid disc struck out of cold rolled material, and it is freely axially slidable relative to the main gear 22. It is normally urged into engagement with the main gear by means of a preferably light and readily deflected spring 44. As here illustrated, the spring is a four-armed piece of metal so bent as to serve the desired purpose.

Figure 10:
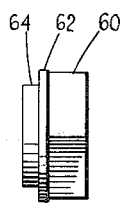
Fig. 10 is a side elevation of the same.
Figure 11:
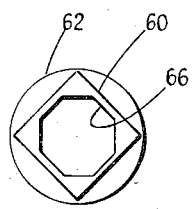
Fig. 11 is an opposite end elevation of the same.
Figure 12:
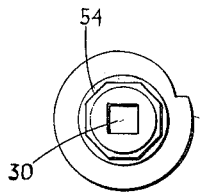
Fig. 12 is an end elevation of the winder bushing.
Figure 13:
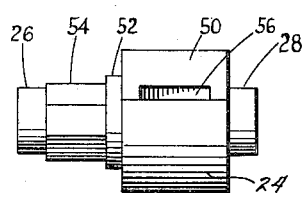
Fig. 13 is a side elevation of the same.
Figure 14:
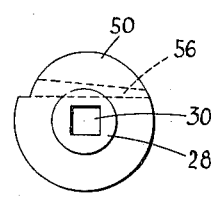
Fig. 14 is an opposite end elevation of the same.
Figure 15:
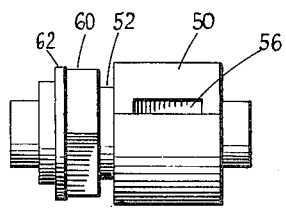
Fig. 15 is a front elevation showing the manner in which the ratchet bushing and winder bushing are assembled, the main gear and ratchet parts being omitted for the sake of clarity.

The complete bushing is made up of two parts which may conveniently be die cast. The larger part, which I may term the winder bushing, is illustrated in Figs. 12, 13 and 14 of the drawings. The smaller part, which I may term the ratchet bushing, is illustrated in Figs. 9, 10 and 11. These two parts are assembled together with a force fit to make a complete bushing, as illustrated in Fig. 15.

Referring to Figs. 12–14 the winder bushing comprises a spring-receiving part 50, a circular part 52, and a non-circular or specifically an octagonal part 54, all in addition to the two cylindrical journals or trunnions 26 and 28 previously referred to. The spring-receiving part 50 is transversely slotted at 56 to receive the inner end of the spring. This slot preferably passes all the way through the bushing so that the inner end of the spring may be passed through the slot and then bent, as is shown at 58 in Fig. 7. The outside of the spring-receiving portion 50 is preferably helical in outline, as shown in Figs. 12 and 14, thus making it possible for the spring to wind up on the bushing in substantially concentric relation thereto. The slot 56 is not diametrical, it being displaced sidewardly in order not to interfere with the square hole 30 extending axially through the bushing.

The circular portion 52 is intended to rotatably receive the main gear. The octagonal portion 54 is intended to non-rotatably receive the ratchet bushing with a force fit.

Referring now to Figs. 9 through 11 the ratchet bushing comprises a non-circular or specifically a square portion 60 followed by a circular flange 62 and a spacer or thrust collar 64. An octagonal hole 66 runs axially through the ratchet bushing. This octagonal hole is dimensioned to mate with the octagonal portion 54 of the winder bushing.

When the parts are assembled together the ratchet bushing is pressed in a suitable press onto the winder bushing until the right-hand end of the ratchet bushing reaches and bears against the circular portion 52 of the winder bushing. The parts are then in the relation shown in Fig. 15.

However, in actual practice the parts of the main gear assembly are disposed on the bushings before the bushings are forced together. When the bushings are then forced together the main gear assembly is complete, except for the attachment of the main spring. Referring to Fig. 4 there is a facing disc 70 which, together with the main gear 22, are placed on the circular portion 52 of the bushing before the two parts of the bushing are assembled. Similarly, the ratchet disc 38 and the spring 44 are placed on the ratchet bushing before the parts are assembled together. It will be understood that the ratchet disc 38 has a square hole slidably receiving the square part 60 of the ratchet bushing. The spring 44 preferably also has a square hole, but this is not essential. The flange 62 limits the outward movement of spring 44.

The facing disc 70 provides a smooth surface against which the main spring 36 may expand or contract without interference. The disc 70 prevents the ratchet teeth 40 from moving through the ratchet slots 42 an excessive amount such that they might be caught upon or interfere with the main spring. This is a refinement which, however, is not essential.

It is believed that the construction and operation of the invention, as well as the many advantages thereof, will be apparent from the foregoing detailed description.

On insertion of the square key in the square hole, the winder bushing may be turned with the key. This turns the main spring. The ratchet teeth 40 are so faced that they slip relative to the main gear. The key is readily removable after the winding operation. When the main spring is released it turns the winder bushing and because of the octagonal fit the ratchet bushing is compelled to turn with the winder bushing. Then because of the square fit the ratchet disc is compelled to turn with the ratchet bushing. The ratchet teeth turn the main gear, and this in turn drives the wheels 18 of the toy. The ratchet is a flat round disc with three extruded lugs which are so short and sturdy that it is practically impossible to buckle or bend the same.

If the toy is pushed or pulled along the ground after the spring has unwound, the ratchet teeth slip relative to the main gear. This is so because the ratchet disc, while a sturdy member capable of taking any torque of the main spring, is, nevertheless, readily moved axially by the biased or sloping camming surface of the ratchet teeth, there being but little resistance to such movement by the preferably light spring 44. The force of the spring is not needed when the ratchet is in driving relation, for the teeth are self-locking in the driving direction.

It will be apparent that while I have shown and described my invention in a preferred form, many changes and modifications may be made in the structure disclosed without departing from the spirit of the invention sought to be defined in the following claims.

I claim:

1. A main gear assembly for a spring motor, said assembly comprising a bushing with bearings at its ends to be rotatably received in a motor frame, said bushing further comprising a non-circular part, a circular part, and a spring-receiving part, a hole passing axially through the bushing to internally receive a key, a ribbon spring coiled about the spring-receiving part, a slot in the bushing offset from the axis enough to clear the aforesaid hole through the bushing, the inner end of said spring being received in said slot, a main gear rotatably mounted on the circular part, a ratchet disc axially slidable but non-rotatable on the non-circular part, a thin light spring urging the ratchet disc toward the main gear, said assembly of said ratchet disc and said main gear having sloping teeth for the desired ratchet action.

2. A main gear assembly for a spring motor, said assembly comprising a bushing with bearings at its end to be rotatably received in a motor frame, said bushing further comprising a square part, a circular part, and a spring-receiving part, a square hole passing axially through the bushing to internally receive a key having a square shank, a ribbon spring coiled about the spring-receiving part, a slot passing entirely through the bushing and offset from the axis enough to clear the aforesaid square hole through the bushing, the inner end of said spring passing entirely through said slot and being bent to anchor the same in position, a main gear rotatably mounted on the circular part, a ratchet disc axially slidable but non-rotatable on the square part, a thin light spring urging the ratchet disc toward the main gear, ratchet teeth struck inwardly on the ratchet disc, and slots cut through the main gear for receiving the teeth of the ratchet disc.

3. A main gear assembly for a spring motor, said assembly comprising a composite bushing made up of a winder bushing and a ratchet bushing assembled together with a force fit, the winder bushing comprising a spring-receiving part and a non-circular part, a slot extending transversely into the spring-receiving part to receive the inner end of the spring, a circular part between said non-circular part and the spring-receiving part, a main gear rotatably received on said circular part, the ratchet bushing being non-circular internally to pass with a force fit over the non-circular part of the winder bushing, the outside of said ratchet bushing being non-circular, a ratchet disc axially slidable but non-rotatable on said ratchet bushing, said assembly of said ratchet disc and main gear having sloping teeth for the desired ratchet action, and resilient means urging said ratchet disc toward the main gear.

4. A main gear assembly for a spring motor, said assembly comprising a composite bushing made up of a winder bushing and a ratchet bushing assembled together with a force fit, the winder bushing comprising a spring-receiving part, a non-circular part, and end bearings to be received in the frame plates of a spring motor, a slot extending transversely through the spring-receiving part to receive the inner end of the spring, a circular part between said non-circular part and the spring-receiving part, a main gear rotatably received on said circular part, the ratchet bushing being non-circular internally to pass with a force fit over the non-circular part of the winder bushing, the outside of said ratchet bushing being non-circular, a ratchet disc axially slidable but non-rotatable on said ratchet bushing, said ratchet disc and main gear having mating teeth and slots for the desired ratchet action, a light spring on said ratchet bushing urging said ratchet disc towards said main gear, the outer end of said ratchet bushing having a collar to hold said spring and ratchet disc on said assembly.

5. A main gear assembly for a spring motor, said assembly comprising a composite bushing made up of a winder and a ratchet bushing assembled together with a force fit, the winder bushing comprising a spring-receiving part, a non-circular sleeve, and end bearings to be received in the frame plates of a spring motor, a non-circular hole passing axially through the winder bushing and adapted to internally receive the shank of a winding key, a slot extending transversely through the spring-receiving part to receive the inner end of the spring, a circular part between said non-circular sleeve and the spring-receiving part, a main gear rotatably received on said circular part, the ratchet bushing being non-circular internally to pass with a force fit over the non-circular sleeve of the winder bushing, the outside of said ratchet bushing being non-circular, a ratchet disc axially slidable but non-rotatable on said ratchet bushing, said assembly of said ratchet disc and main gear having sloping teeth for the desired ratchet action, and a light spring urging said ratchet disc toward said main gear.

6. A main gear assembly for a spring motor, said assembly comprising a composite bushing made up of a winder bushing and a ratchet bushing assembled together with a force fit, the winder bushing comprising a spring receiving part, an octagonal sleeve, and end bearings to be received in the frame plates of a spring motor, a square hole passing axially through the winder bushing and adapted to internally receive the shank of a winding key, a slot extending transversely through the spring-receiving part but offset from the keyhole to receive the inner end of the spring, a circular part between said octagonal sleeve and the spring-receiving part, a main gear rotatably received on said circular part, the ratchet bushing being octagonal internally to pass with a force fit over the octagonal sleeve of the winder bushing, the outside of said ratchet bushing being square, a ratchet disc axially slidable but non-rotatable on said ratchet bushing, said ratchet disc and main gear having mating teeth and slots for the desired ratchet action, a light spring on said ratchet bushing urging said ratchet disc towards said main gear, the outer end of said ratchet bushing having a collar to hold said spring and ratchet disc on said assembly.

7. A main driving gear assembly for a spring-driven motor, said assembly comprising a bushing having a circular part and a non-circular part, a main gear rotatably mounted on the circular part, a rigid ratchet disc which is bodily axially slidable but non-rotatable on the non-circular part, resilient means struck out of thin flat springy sheet metal, and disposed outside of and concentrically with said ratchet disc, said resilient means comprising a central portion received by said bushing, and radially extending spring fingers bent toward and bearing against said ratchet disc, said combination of ratchet disc and main gear having sloping teeth for the desired ratchet action, said resilient means urging said ratchet disc axially toward said main gear, and yielding as said teeth move backward during winding of the spring motor.

8. A main driving gear assembly for a spring-driven motor, said assembly comprising a bushing having a non-circular passage extending axially of the bushing to slidably receive a detachable winding key having a matingly non-circular shank, the outside of said bushing having a circular part and a non-circular part, a main gear rotatably mounted on the circular part, a rigid ratchet disc which is bodily axially slidable but non-rotatable on the non-circular part, resilient means struck out of thin flat springy sheet metal, and disposed outside of and concentrically with said ratchet disc, said resilient means comprising a central portion received by said bushing, and radially extending spring fingers bent toward and bearing against said ratchet disc, said combination of ratchet disc and main gear having sloping teeth for the desired ratchet action, said resilient means urging said ratchet disc axially toward said main gear, and yielding as said teeth move backward during winding of the spring motor.

9. A main driving gear assembly for a spring-driven motor, said assembly comprising a bushing having a circular part and a non-circular part, a main gear rotatably mounted on the circular part, a rigid ratchet disc which is bodily axially slidable but non-rotatable on the non-circular part, resilient means struck out of thin flat springy sheet metal, and disposed outside of and concentrically with said ratchet disc, said resilient means comprising a central portion received by said bushing, and radially extending spring fingers bent toward and bearing against said ratchet disc, said ratchet disc having a plurality of equally spaced teeth sloping toward said main gear, said main gear having mating equally spaced slots for the desired ratchet action, there being twice as many slots as there are teeth, said resilient means urging said ratchet disc axially toward said main gear, and yielding as said teeth and slots disengage during winding of the spring motor.

10. A main driving gear assembly for a spring-driven motor, said assembly comprising a bushing having a circular part and a non-circular part, a main gear made of relatively heavy sheet metal rotatably mounted on the circular part, a rigid completely circular ratchet disc also made of relatively heavy sheet metal, said disc being bodily axially slidable but non-rotatable on the non-circular part, a thin light spring urging the circular ratchet disc axially toward the main gear, said assembly of said ratchet disc and said main gear having sloping teeth and mating slots for the desired ratchet action, said teeth and said slots being located at a radius substantially less than that of the continuous peripheries of the ratchet disc and the gear, whereby there are annular bands of continuous metal outside said teeth and slots.

11. A main driving gear assembly for a spring-driven motor, said assembly comprising a bushing having a circular part and a non-circular part, a main gear rotatably mounted on the circular part, a rigid completely circular ratchet disc which is bodily axially slidable but non-rotatable on the non-circular part, resilient means struck out of thin flat springy sheet metal and disposed outside of and concentrically with said ratchet disc, said resilient means comprising a central portion received by said bushing, and radially extending spring fingers bent toward and bearing against said circular ratchet disc, said combination of ratchet disc and main gear having sloping teeth for the desired ratchet action, said teeth being located at a radius substantially less than that of the continuous circular periphery of the ratchet disc, whereby there is a band of continuous metal outside said teeth, said resilient means urging said ratchet disc axially toward said main gear, and yielding as said teeth move backward during winding of the spring motor.

WILLIAM J. DAILY.